(12) United States Patent
Yoon

(10) Patent No.: US 7,177,670 B2
(45) Date of Patent: Feb. 13, 2007

(54) MOBILE COMMUNICATION TERMINAL PROVIDED WITH HANDSFREE FUNCTION AND CONTROLLING METHOD THEREOF

(75) Inventor: Dong-Jin Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 10/687,767

(22) Filed: Oct. 20, 2003

(65) Prior Publication Data

US 2004/0082368 A1 Apr. 29, 2004

(30) Foreign Application Priority Data

Oct. 22, 2002 (KR) ...................... 10-2002-0064685

(51) Int. Cl.
*H04B 1/38* (2006.01)

(52) U.S. Cl. .................. 455/569.1; 455/564; 455/565; 455/563; 379/420.02; 379/355.02

(58) Field of Classification Search ............ 455/569.1, 455/575.1, 550.1, 435.1, 456.5, 575.2, 556.1, 455/569.2, 567, 412.1, 424, 425, 415, 456.6, 455/561, 575.6, 563, 564, 565, 413, 416, 455/345, 346; 379/88.01–88.04, 88.21, 93.03, 379/354, 355.02, 88.16–88.19, 88.2, 118, 379/207.13, 207.15, 428.01, 420.02, 433.02

See application file for complete search history.

(56) References Cited

U.S. PATENT DOCUMENTS 4,737,976 A * 4/1988 Borth et al. ................ 455/563
5,222,121 A * 6/1993 Shimada ................... 379/88.03
5,805,672 A * 9/1998 Barkat et al. ............. 379/88.03
5,826,187 A * 10/1998 Core et al. ................ 455/412.1
6,212,408 B1 * 4/2001 Son et al. .................... 455/563
6,449,496 B1 * 9/2002 Beith et al. ................. 455/563
7,027,842 B2 * 4/2006 Zhang et al. ............. 455/569.1
2001/0044321 A1 * 11/2001 Ausems et al. ............. 455/556
2004/0001588 A1 * 1/2004 Hairston ..................... 379/419

FOREIGN PATENT DOCUMENTS

CN 1346566 4/2002
JP 01-152847 6/1989

(Continued)

OTHER PUBLICATIONS

CN Office Action dated Mar. 11, 2005.

(Continued)

*Primary Examiner*—Edward F. Urban
*Assistant Examiner*—Charles Chow
(74) *Attorney, Agent, or Firm*—Fleshner & Kim, LLP

(57) ABSTRACT

Disclosed are a mobile communication terminal provided with a hands-free function and a controlling method thereof comprising the steps of: setting a hands-free function of a mobile communication terminal; certifying whether an originating call command or a calling request message are received; searching information of a calling party inputted by a user's voice or an arbitrary originating party's information from a mounted telephone directory; and guiding the searched calling party's information by voice and then connecting a calling. According to this, the user can originate or receive a calling by using a voice recognition function and the hands-free function of the terminal without his hands' using even while driving.

18 Claims, 7 Drawing Sheets

FOREIGN PATENT DOCUMENTS

| | | |
|---|---|---|
| JP | 10-285264 | 10/1998 |
| JP | 10-308818 | 11/1998 |
| JP | 2000-106589 | 4/2000 |
| JP | 2001-308970 | 11/2001 |
| JP | 2002-237877 | 8/2002 |
| KR | 10-2000-0055309 | 9/2000 |
| KR | 10-2001-0095498 | 11/2001 |

OTHER PUBLICATIONS

Korean Office Action.

* cited by examiner

MOBILE COMMUNICATION TERMINAL PROVIDED WITH HANDSFREE FUNCTION AND CONTROLLING METHOD THEREOF

BACKGROUND OF THE INVENTION

1. Field of the Invention

The present invention relates to a mobile communication terminal, and more particularly, to a mobile communication terminal provided with a hands-free function capable of originating a call or receiving a call by a user's voice command and a controlling method thereof.

2. Description of the Related Art

Generally, a mobile communication terminal such as a cellular phone and a PCS phone is a communication device for transmitting and receiving a radio signal differently from a wire telephone. Recently, as the mobile communication terminal becomes small and light so as to be convenient for carrying, a user can originate a call or receive a call at any time.

However, recently, it is regulated to directly use the mobile communication terminal at the time of driving since it may cause an unexpected accident due to an attention lowering. That is, when the user receives a call at the time of driving, the user has to press a button of the mobile communication terminal or open a folder by using hands, and when the user originates a call, eyes of the user have to be towards the mobile communication terminal with hands thus to lower the user's attention.

By reflecting the direct use regulation for the mobile communication terminal, a hands-free function for calling in a predetermined space without directly holding the mobile communication terminal by hands or for charging a battery was developed.

A mounting unit of the hands-free is constructed to mount a microphone and a speakerphone to the mobile communication terminal, the microphone is mounted at a position near to the user, and the speakerphone is mounted at a position where the user can easily hear.

However, in case of additionally mounting the conventional hands-free, the microphone and the speakerphone have to be mounted and the hands-free has to be mounted by wire after changing an indoor structure, a garnish, and etc. in order to connect a battery power used in a vehicle and etc.

Also, in case of additionally mounting the conventional hands-free, the user has a cost burden for installing the hands-free.

SUMMARY OF THE INVENTION

Therefore, an object of the present invention is to provide a mobile communication terminal provided with a hands-free function capable of calling without a user's hands using at the time of originating a call or receiving a call while driving and a controlling method thereof.

To achieve these and other advantages and in accordance with the purpose of the present invention, as embodied and broadly described herein, there is provided a mobile communication terminal provided with a hands-free function comprising: a key inputting means for inputting an operational command of a mobile communication terminal; a microphone for inputting a user's voice message; a display unit for displaying an operational state of the mobile communication terminal; a speakerphone for outputting a calling party's voice outside in a hands-free mode; and a control means for setting a calling mode according to the user's voice message, searching the calling party's name or telephone number according to the user's voice message and thereby voice-guiding through the speakerphone, and switching a calling path through the speakerphone to an earphone at the time of setting a secret calling.

A controlling method of a mobile communication terminal provided with a hands-free function comprises the steps of: setting a hands-free function of a mobile communication terminal; certifying whether an originating calling command or a calling from outside are received; searching information of a calling party inputted by a user's voice or originating party's information from a mounted telephone directory; and voice guiding the calling party's information and connecting a calling.

A controlling method of a mobile communication terminal provided with a hands-free function comprises the steps of: setting a hands-free function of a mobile communication terminal; switching a calling path to a speakerphone and certifying whether a user's voice command for originating a calling exists; searching inputted calling party's information and voice-guiding when the user's voice command is inputted; and connecting a calling to the calling party's telephone number and outputting the calling party's voice to the speakerphone.

A controlling method of a mobile communication terminal provided with a hands-free function comprises the steps of: setting a hands-free function of a mobile communication terminal; switching a calling path to a speakerphone and certifying whether a calling from an arbitrary originating party is received; voice-guiding by obtaining the calling party's information and certifying whether a calling is allowable when the calling is received; and connecting a calling with the calling party and outputting the calling party's voice to the speakerphone when a user's voice command for a calling allowance is inputted.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a mobile communication terminal provided with a hands-free function and a controlling method thereof according to the present invention will be explained.

Figure 1:
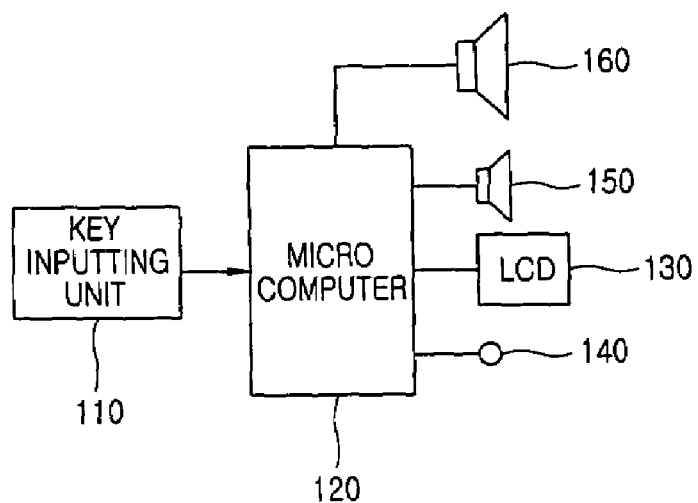
FIG. 1 is a block diagram of a mobile communication terminal according to an embodiment of the present invention.

FIG. 1 is a block diagram of a mobile communication terminal provided with a hands-free function according to an embodiment of the present invention.

As shown, the mobile communication terminal comprises a key inputting unit 110 for inputting a telephone number, a hands-free function setting, and a calling command; a microphone 140 for inputting a user's voice; a display unit 130 for displaying a menu screen, a calling situation, and etc.; a speaker 150 for outputting a calling party's voice; a speakerphone 160 for outputting a calling party's voice in a hands-free mode; and a micro computer 120 for controlling an operation of the mobile communication terminal according to a user's voice inputted to the microphone 140 in controlling an operation for a calling.

The micro computer 120 is provided with a wireless communication module, a video processing module, a display driving module, an audio processing module, and a calling path switching module for switching a calling path between the speaker 150 and the speakerphone 160 or switching a calling path between the speakerphone 160 and an earphone (not shown).

The micro computer 120 comprises a voice-guiding function for obtaining a calling party's information CID, thereby searching whether the information is registered in a telephone directory mounted in the mobile communication terminal, and guiding the search result by voice when a calling from an arbitrary originating party is received; a voice-dialing function for recognizing calling party's information inputted by the user's voice, thereby searching from the telephone directory, and guiding the search result by voice; a voice command function for recognizing a calling command such as a calling connection, a calling finishing, and etc. by a voice command; and a secret calling function for switching a calling path set as a speakerphone as an earphone according to the user' setting.

Figure 2:
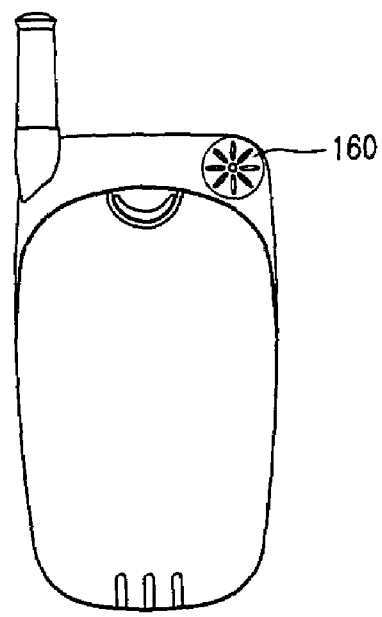
FIG. 2 is an exemplary view showing a mounting position of a speakerphone an embodiment of the present invention.

FIG. 2 is an exemplary view showing a mounting position of a speakerphone an embodiment of the present invention, in which the speakerphone 160 is mounted at an upper side of a back side of the mobile communication terminal. At this time, the speakerphone has to be provided with an enough volume replaying capacity for a driver to hear a calling party's replaying voice while driving even if the mobile communication terminal is positioned at any position in a vehicle.

Operation of the mobile communication terminal provided with a hands-free function according to the present invention will be explained with reference to FIGS. 3 to 9 in more detail.

In the mobile communication terminal, the user directly inputs a calling party's telephone number by using the key inputting unit 110 and then presses a calling key to call with the calling party, and when a calling is received from the calling party, the user presses the calling key to call with the calling party. At this time, the user hears the calling party's voice through the speaker 150 and inputs voice through the microphone 140.

Figure 3:
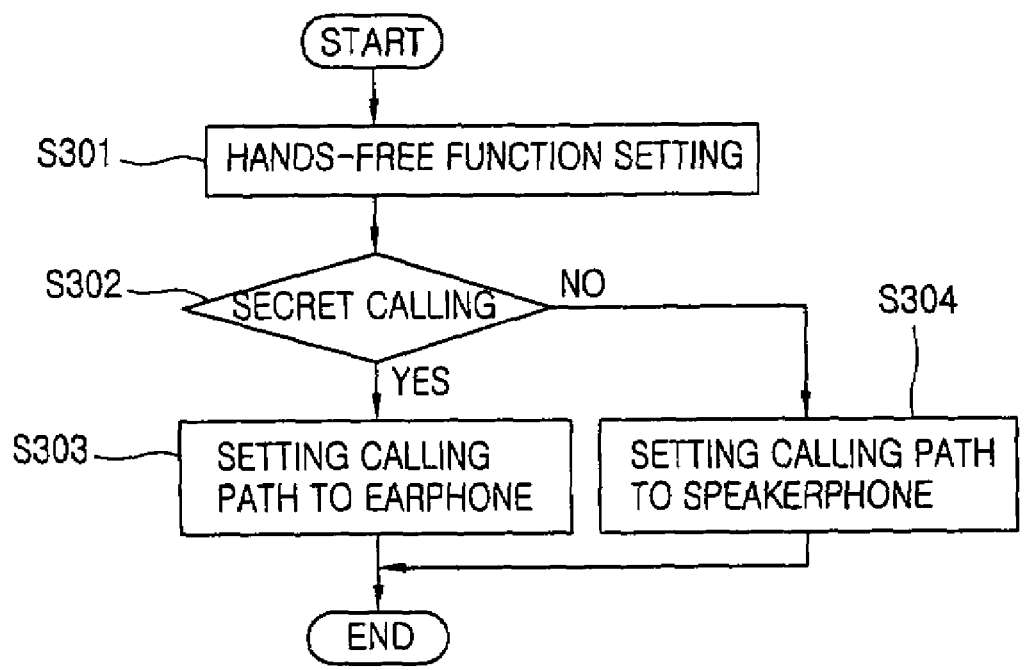
FIG. 3 is a flow chart showing a secret call setting process according to an embodiment of the present invention.

FIG. 3 is a flow chart showing a secret call setting process according to an embodiment of the present invention.

The user sets a hands-free function at a menu screen by using the key inputting unit 110 before driving or by pressing an arbitrary key such as a preset side key (S301). At this time, the micro computer 120 powers-on the speakerphone 160, a NUM key, a voice recognition/voice guiding function, and a voice command function, then sets volume of the speakerphone 160 and volume of a ring tone as a proper level in the vehicle, and greatly modifies a letter font size of the display unit.

Then, a secret calling function is set into the mobile communication terminal in which the hands-free function has been set (S302). The secret calling function is set by pressing an arbitrary key such as a side key installed outside the mobile communication terminal at an arbitrary time point according to the user's necessity after setting the hands-free function. When the secret calling function is set, a calling path set as the speakerphone 160 is switched into a calling path using an earphone (S304).

The secret calling function can be set or released not only through a specific key inputting but also the user's voice command. Also, the hands-free function and the secret calling function can be set not only sequentially but also can be set independently, respectively.

Figure 4:
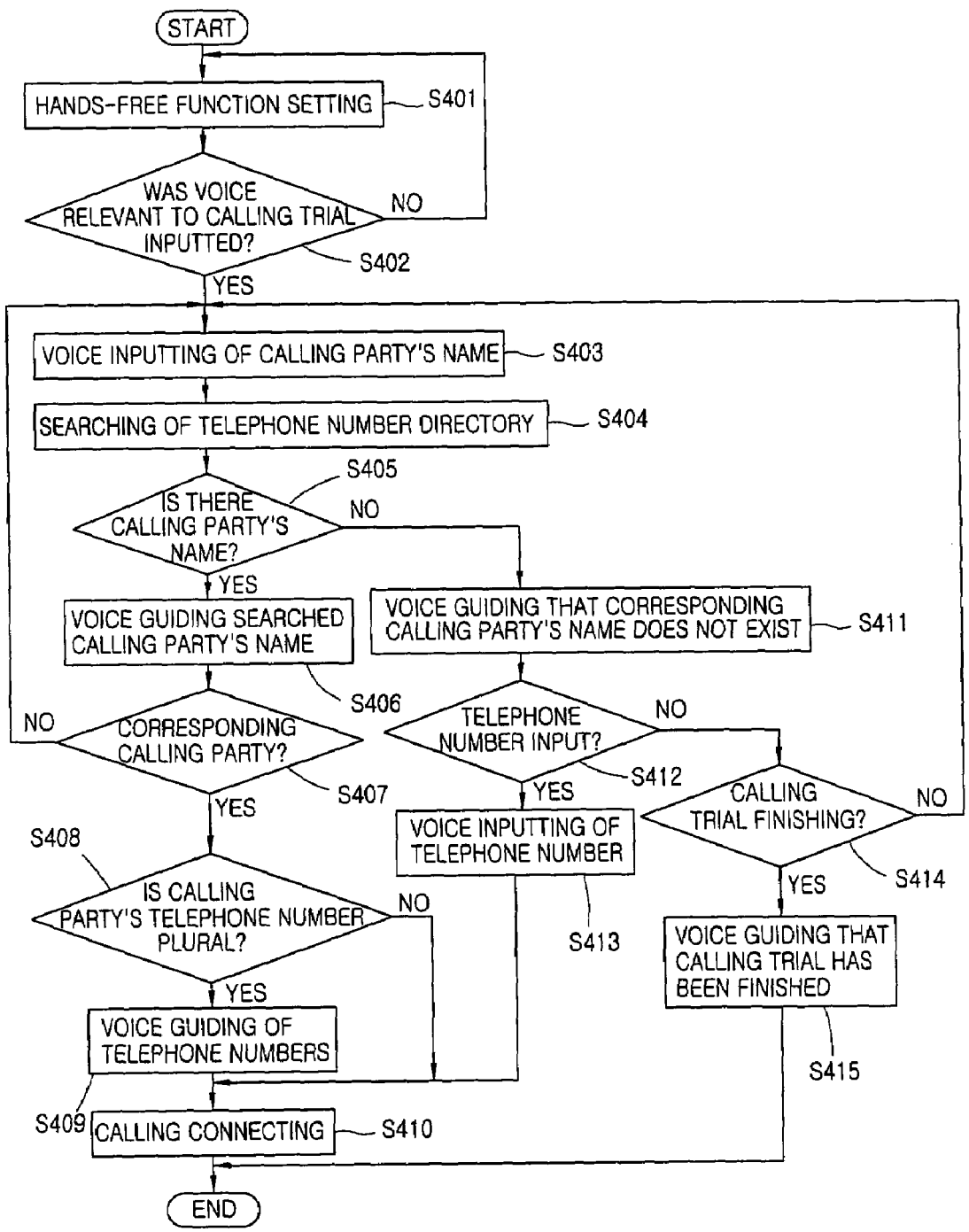
FIG. 4 is a flow chart showing a process for originating a call according to an embodiment of the present invention.
Figure 5:
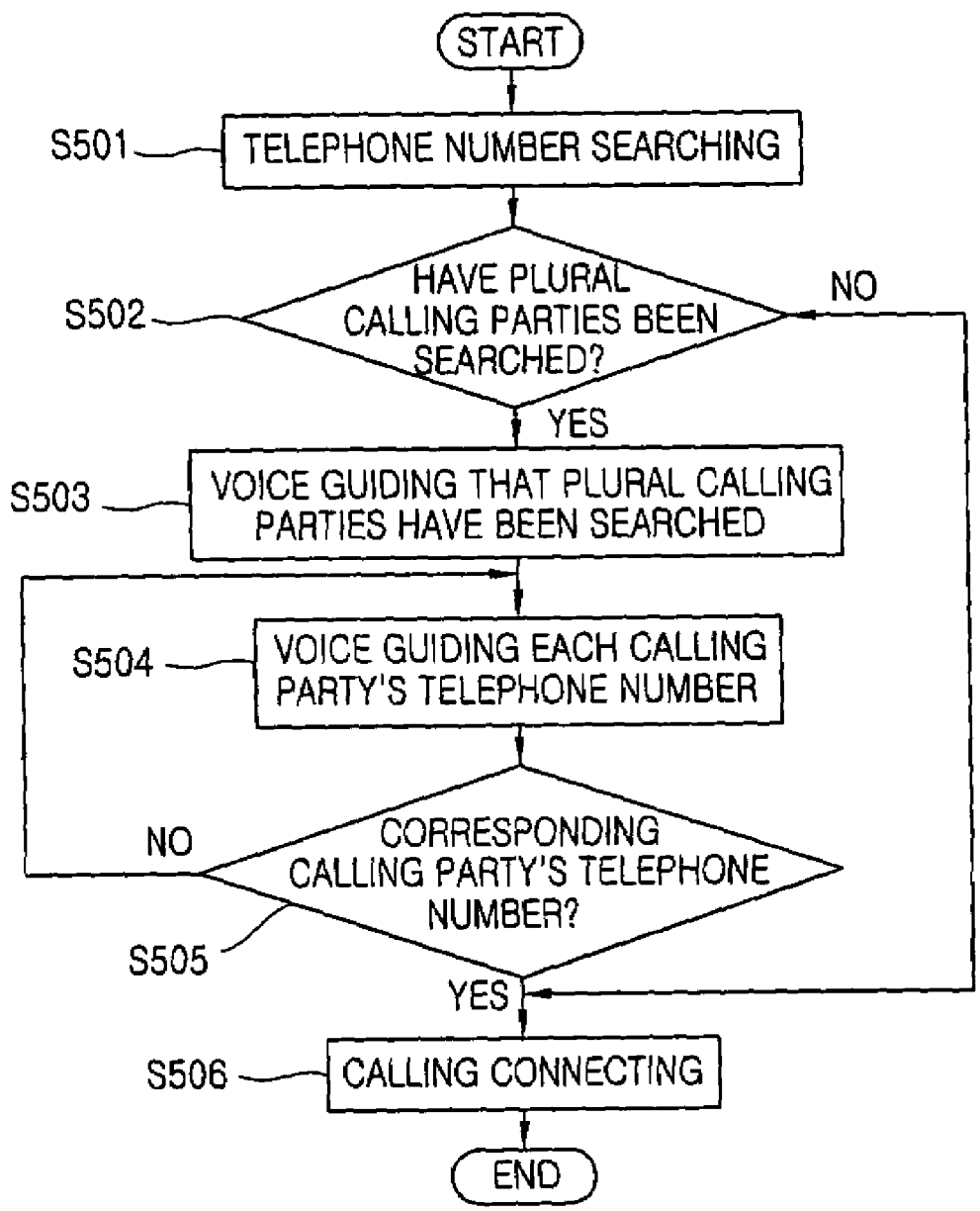
FIG. 5 is a flow chart showing a voice guiding and a telephone number selecting process at the time of searching a plurality of calling parties in FIG. 4.
Figure 6:
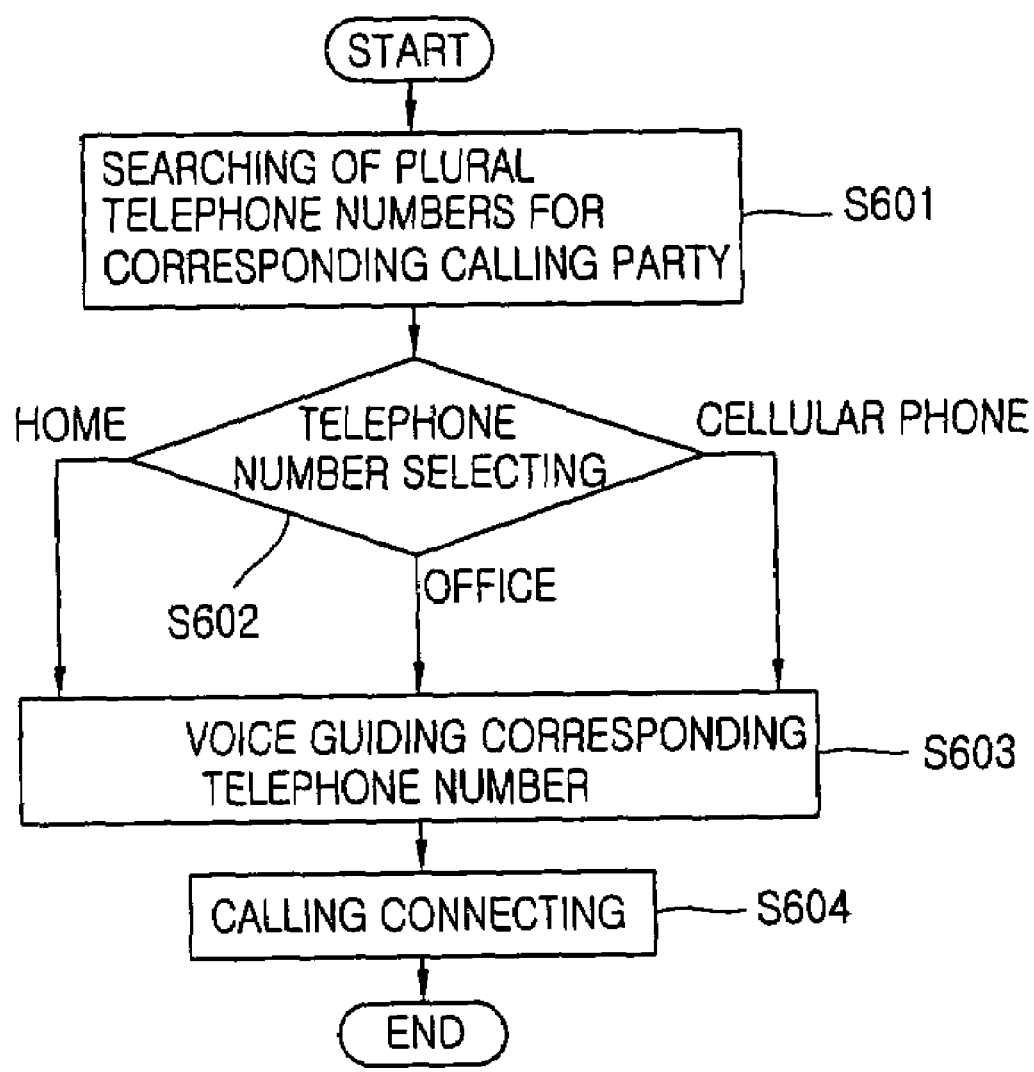
FIG. 6 is a flow chart showing a voice guiding and a telephone number selecting process at the time of searching a plurality of telephone numbers in FIG. 4.
Figure 7:
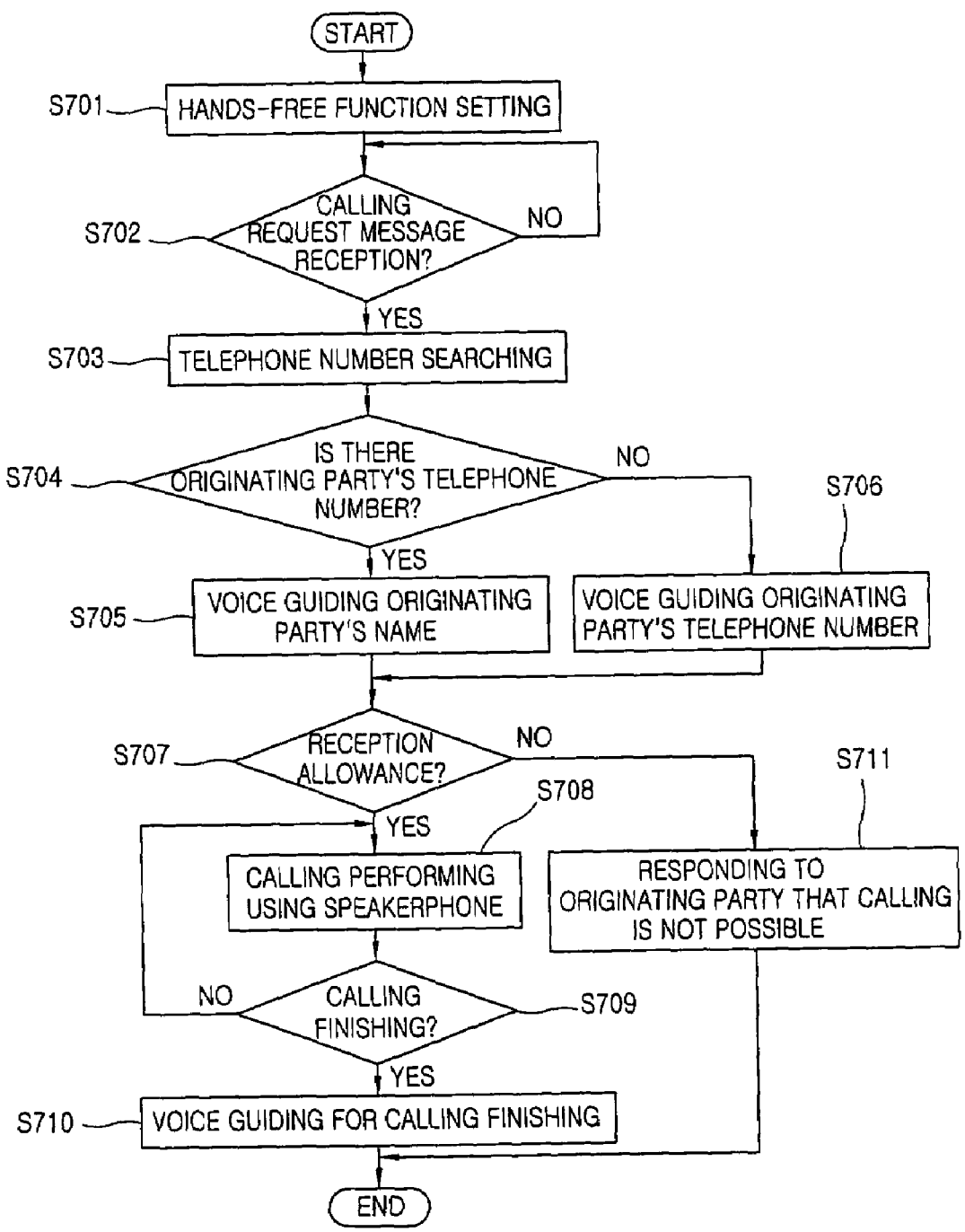
FIG. 7 is a flow chart showing a process for receiving a call according to an embodiment of the present invention.
Figure 8:
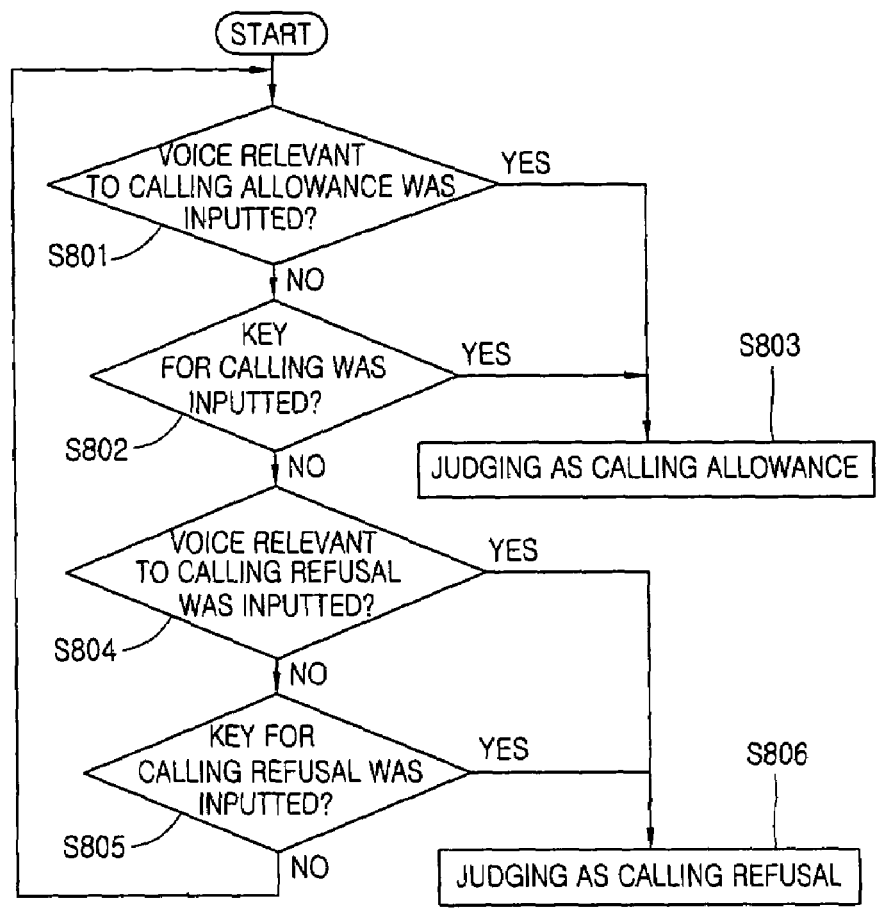
FIG. 8 is a flow chart showing call allowing and refusing processes of FIG. 7.
Figure 9:
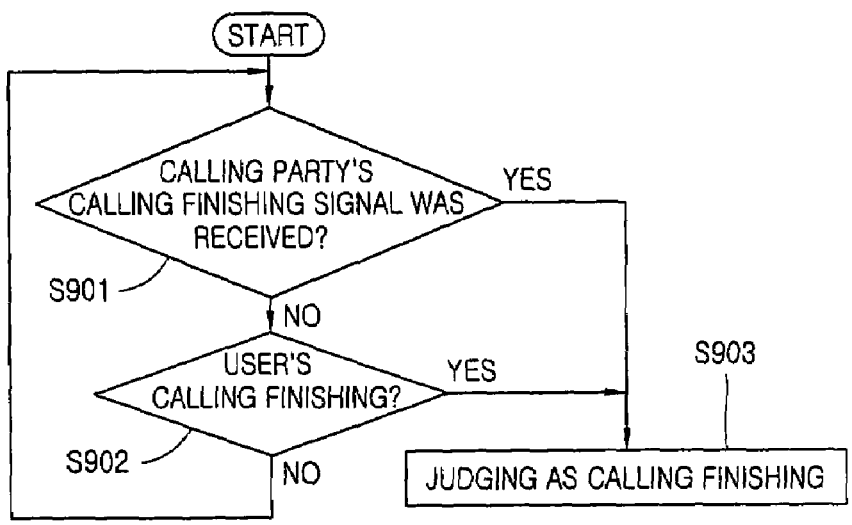
FIG. 9 is a flow chart showing a call finishing process according to an embodiment of the present invention.

FIGS. 4 to 9 are flow charts showing a process for connecting a calling by voice in a state that the hands-free function has been set according to the present invention, in which FIG. 4 is a flow chart showing a process for originating a call according to an embodiment of the present invention, FIG. 5 is a flow chart showing a voice guiding and a telephone number selecting process at the time of searching a plurality of calling parties in FIG. 4, FIG. 6 is a flow chart showing a voice guiding and a telephone number selecting process at the time of searching a plurality of telephone numbers in FIG. 4, FIG. 7 is a flow chart showing a process for receiving a call according to an embodiment of the present invention, FIG. 8 is a flow chart showing call allowing and refusing processes of FIG. 7, and FIG. 9 is a flow chart showing a call finishing process according to an embodiment of the present invention.

First, when the hands-free function has been set to the mobile communication terminal (S401), the micro computer 120 checks whether voice relevant to a calling trial has been inputted through an output signal of the microphone 140 (S402).

When the voice relevant to a calling trial has been inputted to the microphone 140, the micro computer 120 outputs a voice guiding through the speakerphone 160. That is, if the user inputs voice of a calling connection, a calling trial, a calling, and etc., the micro computer 120 outputs a voice guiding such as 'please leave your name after the beep'.

When the user of the mobile communication terminal inputs a calling party's name through the microphone 140 (S403), the micro computer 140 searches a mounted telephone directory (S404) thus to certify whether the calling party's name inputted by the user's voice exists (S405). At this time, the micro computer 140 displays the calling party's name inputted by the user's voice at the display unit 130 and thereby the user can certify the calling party's name has been precisely recognized.

When the calling party's name has been certified from the telephone directory, the micro computer 120 outputs a corresponding name to the speakerphone 160 thus to guide to the user by voice (S406) and the user checks whether the certified name is consistent with the calling party (S407).

If the searched calling party is not the calling party inputted by the user, the user inputs voice such as 'He is not a corresponding calling party.' to the microphone 140 and the micro computer 120 returns the mobile communication terminal to the process for inputting a calling party's name (S403).

If the searched calling party is a desired calling party, the user inputs a voice message for admitting the search result such as 'OK', 'He is a calling party.', 'He is a right calling party.', and etc. to the microphone 140.

In case that the searched calling party's registration telephone number is one, the micro computer 120 originates a calling with a corresponding telephone number thus to perform a calling connection (S410). However, in case that registered telephone numbers are more than two, the micro computer 120 sequentially guides the telephone numbers by voice through the speakerphone 160 (S409), and when the user selects a desired telephone number, the micro computer 120 originates a calling with the selected telephone number thus to perform a calling connection (S410).

A case that the searched telephone numbers are plural will be explained in more detail with reference to FIG. 6.

If telephone numbers registered for the calling party are plural (S601), the micro computer 120 outputs a voice message such as 'Plural telephone numbers are searched.' to the speakerphone 160, and outputs a voice message such as 'Where do you want to call among home, office, or cellular phone?' to the speakerphone 160 (S602).

When the user selects one to which a calling will be connected and inputs by voice to the microphone 140, the micro computer 120 guides a corresponding telephone number by voice (S603) and then tries a calling connection (S604). Herein, even if the plural telephone numbers were aforementioned by being divided into home, office, and cellular phone, more telephone numbers can be registered if necessary.

When the calling party has not been searched from the mounted telephone directory, the micro computer 120 outputs a voice message such as 'No corresponding calling party's name' to the speakerphone 160 (S411), and outputs a voice message such as 'Would you input the calling party's telephone number by voice?' to the speakerphone 160 (S412).

Then, the user inputs a certification message such as 'Yes' or 'OK' that he will input the calling party's telephone number by voice to the microphone 140 and then inputs the calling party's telephone number by voice (S413), the micro computer 120 originates a calling to the telephone number thus to perform a calling connection (S410).

However, when the user inputs a voice message for finishing a calling trial such as 'Calling finish', 'Calling refusal', or 'NO' to the microphone 140 for a voice message such as 'Would you input the calling party's telephone number by voice?' or presses an arbitrary key such as a side key or a finishing key (S414), the micro computer 140 outputs a voice message such as 'A calling trial has been finished.' to the speakerphone 160 and then finishes the calling trial process (S415). At this time, the user does not input a calling finish command within a certain time, the micro computer 120 returns to a calling waiting state for receiving the calling party's name.

A case that several same calling party's names are searched during the process (S404) for searching the calling party's name inputted by the user will be explained in more detail with reference to FIG. 5.

When the same calling party's names more than two as the calling party inputted by the user's voice are searched (S501, S502), the micro computer 120 outputs a voice message such as 'The same plural calling parties have been searched.' to the speakerphone 160 (S503), and guides telephone numbers of the searched respective calling parties to the user by voice (S504).

If the user certifies whether the guided telephone number is the calling party's telephone number (S505) and then inputs a voice message such as 'NO', 'Calling refusal', and 'He is not a corresponding calling party.' to the microphone 140, the micro computer 120 guides a next calling party's telephone number by voice (S504), and if the user inputs a voice message for allowing the search result such as 'OK', or 'He is the calling party.' to the microphone 140, the micro computer 120 originates a calling to the corresponding telephone number thus to perform a calling connection (S506).

In case that plural calling parties having the same name as the calling party are searched, the searched calling parties' telephone numbers were sequentially guided by voice in the above process. However, identification names such as home, a company address, and a company name for identifying each calling party can be inputted by the user's voice just at the time of searching the plural calling parties, thereby certifying the calling party right now and performing a calling connection to the telephone number.

When a calling is connected by said process, the user hears the calling party's voice through the speakerphone 160, then inputs a calling voice to the microphone 140 thus to perform a calling with his desired calling party, and finishes a calling.

As shown in FIG. 9, when a calling finishing signal is received from the calling party (S901) or when the user presses a side key or a finishing key preset to recognize a calling finishing if the user presses during a calling (S902), the micro computer 120 judges that a calling finishing has been requested from the user (S903) thus to finish a calling and to return to a calling waiting state.

FIGS. 7 and 8 are flow charts showing a process for receiving a calling in a state that the hands-free function has been set according to the present invention, in which FIG. 7 is a flow chart showing a process for receiving a call according to an embodiment of the present invention and FIG. 8 is a flow chart showing call allowing and refusing processes of FIG. 7.

When the hands-free function of the mobile communication terminal has been set (S701), the micro computer 120 checks whether a calling request message is received from an arbitrary originating party (S702).

When the calling request message has been received, the micro computer 120 temporarily stores an originating party's call identifier (CID) and a telephone number and searches a mounted telephone directory (S703) thus to certify whether a telephone number consistent with the telephone number exists (S704). At this time, it can be constructed for the micro computer 120 to guide the calling request message reception to the user by voice and then search the telephone directory.

If the calling party's telephone number exists in the mounted telephone directory (S704), the micro computer guides a calling party's name corresponding to the telephone number by voice by using a text to speech function (S705). At this time, it can be constructed for the micro computer 120 to display searched names at the display unit 130 so that the user can precisely recognize the originating party's name.

In case that the micro computer has not searched the originating party's telephone number from the mounted telephone number directory, a received telephone number is voice-guided through the speakerphone 160 (S706).

After guiding the originating party's name or telephone number by voice, the micro computer 120 outputs a voice message such as 'Would you call?' to the speaker 160 and certifies the user's voice received through the microphone 140 thus to determine a calling allowance with the originating party or not. (S707). That is, when the user inputs voice for a calling allowance such as 'OK', 'Calling allowance', or 'Calling connection' to the microphone 140, the microphone 120 outputs the calling party's voice to the speakerphone 160 and transmits the user's voice inputted to the microphone 140 to the calling party by a wireless communication, thereby performing a calling between the user and the calling party (S709).

When the calling between the user and the calling party has been finished (S709), the micro computer 120 switches the mobile communication terminal into a calling waiting state for sensing a calling request message and outputs a voice message that the calling has been finished to the speakerphone 160 (S710). Said calling finishing process is performed as the same process as a process shown in FIG. 9, thereby omitting its detail explanations.

If the user inputs a voice message such as 'NO', 'Calling refusal', or 'Calling finish' to the microphone 140 when the calling party's name or telephone number are guided by voice, the micro computer 120 transmits a response message for an impossible calling to the originating party through a base station or a wireless switching center and returns to a calling waiting state (S711). At this time, the user can select a calling refusal by pressing an arbitrary key such as a side key or a finishing key instead of a voice input, and the micro computer 120 informs the user that the calling has been refused by flickering a mute lamp or by using a voice message.

The process for a calling allowance or a calling finish S707 of FIG. 7 will be explained with reference to FIG. 8.

When an originating party's name or a telephone number of an originating calling are guided by voice (S705, S706), if the user inputs a voice message for a calling allowance to the microphone 140 (S801) or inputs a preset arbitrary key such as a calling key (S802), the micro computer 120 judges as a calling allowance (S803). However, if the user inputs a voice message relevant to a calling finish to the microphone 140 (S804) or inputs a preset arbitrary key such as a finishing key (S805), the micro computer 120 judges as a calling refusal (S806).

A calling connection process in a secret calling according to the present invention will be explained as follows. Herein, the secret calling is performed by processes shown in FIGS. 4 to 7 for convenience while driving, and when there is a car occupant next the user, the user can hear the calling party's voice only by an earphone.

First of all, at the time of calling with an arbitrary originating party in the secret calling setting state, the user inputs a telephone number by using a key pad provided at the key inputting unit 110, then presses a calling key thus to connect a calling, and inputs voice to a microphone provided at an earphone while hearing the calling party's voice by the earphone under a state that calling has been connected.

When the secret calling is not necessary even if there is a car occupant, as shown in FIG. 3, the user inputs a calling party's name or telephone name to the microphone 140 by voice and the micro computer 120 searches a mounted telephone directory thus to guide the search result by voice. When the user inputs a calling allowance for the searched result to the microphone 140 by voice, the micro computer 120 connects a calling with the calling party by a wireless communication. At this time, the user can switch a calling path in order to hear the calling party's voice by the speakerphone 160 or the earphone.

Also, when a calling from an arbitrary originating party is generated under a state that the secret calling has been set, as shown in FIG. 7, the micro computer 120 temporarily stores the calling party's call identifier (CID) and telephone number, then informs the user that there is a calling reception through the speakerphone 160, and searches a mounted telephone directory thus to certify whether the corresponding telephone number exists. Then, the micro computer 120 guides the calling party's name or telephone number to the user through an earphone. When the user inputs voice for a calling allowance to a mike provided at the earphone or presses an arbitrary key such as a calling key or a side key, the micro computer 120 judges as a calling allowance state thus to output the calling party's voice to the user through the earphone and transmits the user's voice inputted to the microphone to the calling party.

If it doesn't matter for a car occupant to hear calling contents or the car occupant need not a calling when a calling from an arbitrary originating party is generated, the user releases the set secret calling by pressing an arbitrary key. Then, the micro computer 12 switches a calling path from the earphone to the speakerphone 160 and inputs the user's voice to the microphone 140. That is, even if the secret calling has been set, if the user releases the secret calling setting by pressing an arbitrary key such as a side key, the micro computer 120 outputs the calling party's voice to the speakerphone 160 and recognizes voice through the microphone 140 or a mike provided at the earphone, thereby enabling for not only the user but also the car occupant to call with the calling party.

As aforementioned, in the mobile communication terminal provided with a hands-free function and the controlling method thereof according to the present invention, the user can connect a calling with a calling party by voice or can allow a calling by voice for a calling from an arbitrary originating party. Accordingly, a risk factor that the user has to press an arbitrary key or certify a display unit while driving can be removed and an operation relevant to a calling can be controlled by voice, thereby enhancing the user's convenience.

Also, in the mobile communication terminal provided with a hands-free function and the controlling method thereof according to the present invention, a secret calling can be set according to the user's need thereby to prevent an invasion of privacy.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal provided with a hands-free function comprising:

a key inputting means for inputting an operational command of a mobile communication terminal;

a microphone for inputting a user's voice message;

a display unit for displaying an operational state of the mobile communication terminal;

a speakerphone for outputting a calling party's voice in a hands-free mode; and a control means for setting a calling mode according to the user's voice message, searching the calling party's name or telephone number according to the user's voice message and thereby voice-guiding through the speakerphone, and switching a calling path through the speakerphone to an earphone at the time of setting a secret calling according to a voice message of the user.

2. The terminal of claim 1, wherein the control means comprises:

a voice-guiding function for searching originating party's information from a mounted telephone directory and outputting the search result by voice when a calling request message from an arbitrary originating party is received;

a voice-dialing function for searching calling party's information inputted by a user's voice from the mounted telephone directory and outputting the search result by voice; and a voice command function for recognizing a calling command such as a calling connection, a calling finishing.

3. The terminal of claim 1, wherein the control means sets and releases a hands-free function or a secret calling function by a specific key adjustment by the key inputting means.

4. The method according to claim 1, wherein the secret calling comprises a function switching the calling path to an output audio device private to the user.

5. A controlling method of a mobile communication terminal provided with a hands-free function comprising:

setting a hands-free function of a mobile communication terminal;

certifying whether an originating call command or a calling request message are received;

searching information of a calling party inputted by a user's voice or an arbitrary originating party's information from a mounted telephone directory;

voice-guiding the searched calling party's information or originating party's information and then connecting a calling; and setting a secret calling function for switching a calling path from a speakerphone to an earphone in response to a voice command from the user.

6. The method of claim 5, wherein the calling party's information and originating party's information are calling party's or originating party's names or telephone numbers.

7. A controlling method of a mobile communication terminal provided with a hands-free function comprising:

setting a hands-free function of a mobile communication terminal;

switching a calling path to a speakerphone and certifying whether a user's voice command for originating a calling exists;

searching inputted calling party's information and voice-guiding when the user s voice command is inputted;

connecting a calling to the calling party's telephone number and outputting the calling party's voice to the speakerphone; and setting a secret calling function for switching a calling path from the speakerphone to an earphone in response to a voice command from the user.

8. The method of claim 7, wherein the voice-guiding comprises:

waiting for a voice input of calling party's information when a voice command for originating a calling is certified;

searching a mounted telephone directory when the calling party's information is inputted by voice;

voice-guiding a search result and then certifying the search result is right information when the calling party's information is searched; and connecting a calling to a corresponding telephone number when a user's voice that the search result is right information is inputted.

9. The method of claim 8, wherein the calling party's information is a name of the calling party.

10. The method of claim 8, further comprising requesting an input of the calling party's telephone number when the calling party's information is not searched.

11. The method of claim 8, further comprising returning to a waiting process for inputting the calling party's information by voice when the user's voice that the search result is not right information is inputted.

12. The method of claim 8, wherein corresponding information is sequentially guided by voice when plural calling parties are searched in the certifying whether the search result is right information.

13. The method of claim 8, further comprising:

requesting different identification information when plural calling parties are searched; and re-searching corresponding identification information at the search result when calling party's identification information has been inputted by voice in the certifying whether the search result is right information.

14. The method of claim 8, wherein the connecting a calling comprises:

certifying whether the calling party's telephone numbers which have been judged as right information are plural;

voice-guiding each telephone number sequentially when the plurality of telephone numbers have been searched and certifying right information; and connecting a calling to the certified telephone number.

15. A controlling method of a mobile communication terminal provided with a hands-free function comprises:

setting a hands-free function of a mobile communication terminal;

switching a calling path to a speakerphone and certifying whether a calling request message from an arbitrary originating party is received;

searching originating party's information, then voice-guiding, and certifying whether a calling is allowable when the calling request message has been received;

connecting a calling with the originating party and outputting the originating party's voice to the speakerphone when a user's voice command for a calling allowance has been inputted; and setting a secret calling function for switching a calling path from the speakerphone to an earphone in response to a command from the user.

16. The method of claim 15, wherein the originating party's information is a telephone number.

17. The method of claim 15, wherein the certifying whether a calling is allowable comprises:

obtaining originating party's information when a calling request message has been certified;

checking whether the obtained originating party's information has been registered in a mounted telephone directory;

voice-guiding the search result and certifying whether a calling is allowable; and connecting a calling when a voice command for a calling allowance has been certified and finishing a calling when a voice command for a calling refusal has been certified.

18. The method of claim 17, wherein the certifying whether a calling is allowable comprises:

voice-guiding an originating party's name and certifying whether a calling is allowable when originating party's information has been searched; and voice-guiding originating party's telephone number and certifying whether a calling is allowable when the originating party's information has not been searched.

* * * * *